UNITED STATES PATENT OFFICE.

CHARLES S. GORMAN, OF IRVINE, COUNTY OF AYR, GREAT BRITAIN.

IMPROVEMENT IN THE MANUFACTURE OF CHROMATES OF POTASH AND SODA.

Specification forming part of Letters Patent No. 219,637, dated September 16, 1879; application filed February 11, 1878; patented in England, July 21, 1877.

*To all whom it may concern:*

Be it known that I, CHARLES STUART GORMAN, of Irvine, in the county of Ayr, Great Britain, chemist, have invented new and useful Improvements in the Manufacture of Chromates of Potash and Soda, which improvements are fully set forth in the following specification.

Under the ordinary process of manufacturing chromates of potash and soda, as hitherto conducted, very considerable quantities of the alkaline salts are lost by volatilization at the high temperatures used, and much of the sesquioxide of chromium employed in the process is left in the waste or residual products; and the object of the present invention is to utilize more effectually than has hitherto been done the sesquioxide of chromium and to prevent undue waste of alkaline salts.

According to my improved process, the chrome ore, lime, and carbonate of potash, in the usual proportions, are well mixed, and are calcined or roasted in a furnace at a red heat, in the ordinary manner; but when the calcination is nearly completed, as will be found to be the case ordinarily when the charge has been in the furnace for about seven hours, it is then withdrawn and allowed to cool; and I add to the charge (either before or after being withdrawn to cool) a further quantity—say from ten to twenty per cent., of carbonate of potash— or of its chemical equivalent of carbonate of soda, caustic potash or soda, or a mixture of both, either in the solid or liquid state. The charge is then refurnaced at a much lower temperature than that represented by the red heat above mentioned, or, say, at from 800° to 1200° Fahrenheit, according to the quality of the ore, (either in the same or a separate furnace,) the result being to convert the sesquioxide of chromium into chromates by combining with the alkaline salts, and thereby save the great loss of that material which takes place under the ordinary process.

The foregoing process may be modified as follows to attain the same result:

I employ chrome ore, caustic lime, or carbonate of lime, and the proportions which I find most beneficial are as follows—that is to say: three hundred parts of chrome ore and two hundred parts of caustic lime, or three hundred and fifty-eight parts of carbonate of lime, or its equivalents of carbonate of magnesia or carbonate of barytes. These are mixed, and are treated at a much higher heat than is used in the other process above described—say to the heat corresponding to the white heat obtained in a reverberatory or a "Siemens" furnace, or in an ordinary chrome-furnace—the heat being continued until the ore is decomposed, the iron in the ore peroxidized, and the sesquioxide of chromium set free.

The charge or "batch," which may be taken to consist of about five to six hundred-weights, is then drawn from the furnace to cool, and mixed with a proportion of about two hundred and forty pounds of carbonate of potash, or its chemical equivalent of sulphate of potash or carbonate of soda, caustic potash or caustic soda, either in the solid or liquid state; but if in the liquid state, from fifty to one hundred pounds of burned lime is added to dry the batch, which is then charged into the ordinary chrome-furnace, or a revolving furnace, in which it is treated at a comparatively low temperature—say from 800° to 1200° Fahrenheit, according to the quality of the ore—the result being to effect the requisite combination and to convert the sesquioxide of chromium into chromate of potash or soda, and so prevent the great loss of alkaline salts by volatilization which takes place when the entire process is carried on throughout at the temperatures heretofore used in the ordinary process.

Thus, by my invention, a greater yield of chromates is obtained with much less loss of sesquioxide of chromium or of alkaline salts than is found to result from the ordinary process of manufacturing chromates.

I am aware that before my invention chrome ore had been subjected to several heatings, which involved a considerable loss of potash by volatilization. In English Patent No. 690 of 1852, a method of making chromates and bichromates of potash is described, which provides for furnacing the chrome ore with carbon to reduce the iron to a metallic state, then removing the same with sulphuric acid, and afterward furnacing the chrome with carbonate of potash and saltpeter.

By my method the use of acid is avoided, and in the first furnacing the ore is decomposed, the iron being peroxidized and the sesquioxide of chromium set free, so that the second furnacing of the same at a lower temperature with the alkali produces the chromate of potash or soda with but little loss of the potash or soda.

I am also aware that in the manufacture of chromates a second furnacing has been employed, in which kelp has been introduced with the product of the first furnacing; but this was used with reference to the production of iodine, bromine, and carbonate of potash I do not therefore lay any claim to the separate furnacing in itself.

I claim—

In the manufacture of chromates of potash or soda, the process herein described, consisting in furnacing the chrome ore mixed with lime and carbonate of potash, or their equivalents, as specified, cooling the charge, adding the alkaline carbonates specified, and reheating the mass at a comparatively low temperature, substantially as set forth.

CHARLES STUART GORMAN.

Witnesses:
    JOHN BROWN,
        96 *Buchanan Street, Glasgow.*
    THOMAS RUSSELL,
        96 *Buchanan Street, Glasgow.*